United States Patent
Regev et al.

(10) Patent No.: US 12,113,658 B1
(45) Date of Patent: Oct. 8, 2024

(54) MODULATION ORDER SELECTION ASSOCIATED WITH RESILIENCY AGAINST SPUR IMPAIRMENT

(71) Applicant: QUALCOMM Incorporated, San Diego, CA (US)

(72) Inventors: Aviv Regev, Tel Aviv (IL); Ronen Shaked, Kfar Saba (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 18/320,091

(22) Filed: May 18, 2023

(51) Int. Cl.
*H04L 27/34* (2006.01)
*H04L 27/38* (2006.01)

(52) U.S. Cl.
CPC ...... *H04L 27/3405* (2013.01); *H04L 27/3854* (2013.01)

(58) Field of Classification Search
CPC .................. H04L 27/3405; H04L 27/3854
See application file for complete search history.

(56) References Cited

U.S. PATENT DOCUMENTS

| | | | |
|---|---|---|---|
| 2009/0191910 A1* | 7/2009 | Athalye | H04W 52/243 455/522 |
| 2010/0203826 A1* | 8/2010 | Xue | H04L 27/3461 455/17 |
| 2020/0389250 A1* | 12/2020 | Goichberg | H04L 1/0003 |

* cited by examiner

*Primary Examiner* — Sung S Ahn
(74) *Attorney, Agent, or Firm* — Kevin M. Donnelly; Norton Rose Fulbright US LLP

(57) ABSTRACT

This disclosure provides systems, methods, and apparatuses, including computer programs encoded on computer storage media, for wireless communication. In one aspect of the disclosure, a method for wireless communication performed by a user equipment (UE) includes receiving first and second indications of respective first and second sets of subcarriers associated with respective first and second modulation orders. Each subcarrier of the second set of subcarriers is associated with a first RF spur associated with the network node. The method further includes demodulating respective first and second signals concurrently received on the respective first and second sets of subcarriers in accordance with the respective first and second modulation orders. Other aspects and features are also claimed and described.

30 Claims, 8 Drawing Sheets

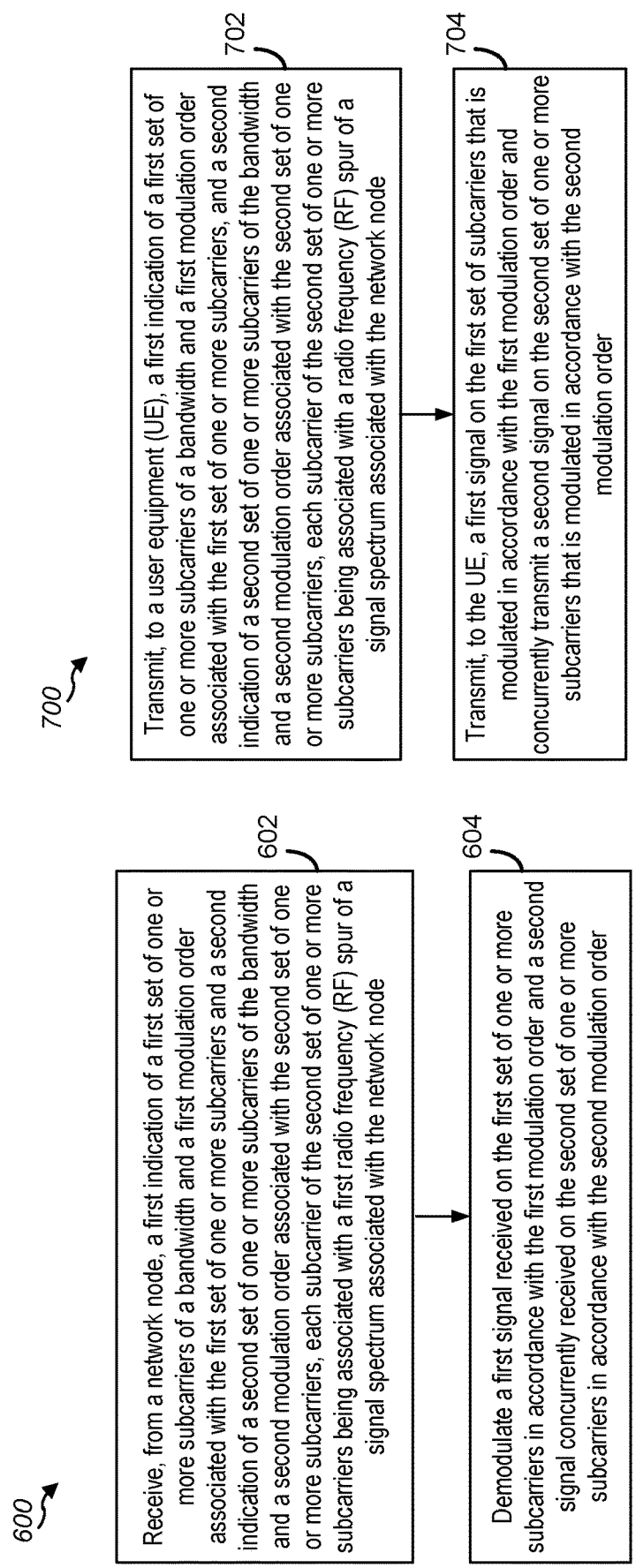

MODULATION ORDER SELECTION ASSOCIATED WITH RESILIENCY AGAINST SPUR IMPAIRMENT

TECHNICAL FIELD

Aspects of the present disclosure relate generally to wireless communication systems, and more particularly, to selection of modulation orders that may be associated with resiliency against spur impairment.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

UEs and base stations may encounter spikes in radio frequency (RF) noise or interference at particular frequencies. Such spikes, which may referred to as RF spurs, may impact reliability of communications between a UE and a base station. For example, spurs may negatively impact a signal to noise ratio for communication between a base station and a UE. Spurs may, for example, be caused by internal characteristics of a base station, such as one or more unsynchronized clocks of a base station or other aspects of a base station. Interference caused by RF spurs may make it difficult, or impossible, to demodulate signals modulated using modulation and coding schemes of high orders, such as a 4k or 16k quadrature amplitude modulation (QAM). Although use of lower modulation orders may make communications more reliable when RF spurs are present, such use of low modulation orders generally results in reduced efficiency of communication between a UE and a base station as compared to use of higher modulation orders.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes receiving, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and demodulating a first signal received on the first set of one or more subcarriers in accordance with the first modulation order and a second signal concurrently received on the second set of one or more subcarriers in accordance with the second modulation order.

Another innovative aspect of the subject matter described in this disclosure can be implemented in a UE. The UE includes one or more memories storing processor-readable code and one or more processors coupled to the one or more memories and operable, individually or collectively, to cause the UE to receive, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and demodulate a signal received on the first set of one or more subcarriers in accordance with the first modulation order and a signal concurrently received on the second set of one or more subcarriers in accordance with the second modulation order.

Another innovative aspect of the subject matter described in this disclosure can be implemented in an apparatus configured for wireless communication. The apparatus includes means for receiving, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and means for demodulating a first signal received on the first set of one or more subcarriers in accordance with the first modulation order and a second signal concurrently received on the second set of one or more subcarriers in accordance with the second modulation order.

Another innovative aspect of the subject matter described in this disclosure can be implemented in a non-transitory computer-readable medium storing instructions that, when executed by a processor, cause the processor to perform operations including receiving, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and demodulating a first signal received on the first set of one or more subcarriers in accordance with the first modulation order and a second signal concurrently received on the second set of one or more subcarriers in accordance with the second modulation order.

Another innovative aspect of the subject matter described in this disclosure can be implemented in a method for wireless communication performed by a network entity. The method includes transmitting, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and transmitting, to the UE, a first signal on the first set of subcarriers that is modulated in accordance with the first modulation order and concurrently transmitting a second signal on the second set of one or more subcarriers that is modulated in accordance with the second modulation order.

Another innovative aspect of the subject matter described in this disclosure can be implemented in a network entity. The network entity includes one or more memories storing processor-readable code and one or more processors coupled to the one or more memories and operable, individually or collectively, to cause the network entity to transmit, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a radio frequency (RF) spur of a signal spectrum associated with the network node and transmit, to the UE, a first signal on the first set of subcarriers that is modulated in accordance with the first modulation order and concurrently transmit a second signal on the second set of one or more subcarriers that is modulated in accordance with the second modulation order.

Another innovative aspect of the subject matter described in this disclosure can be implemented in an apparatus configured for wireless communication. The apparatus includes means for transmitting, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and means for transmitting, to the UE, a first signal on the first set of subcarriers that is modulated in accordance with the first modulation order and concurrently transmitting a second signal on the second set of one or more subcarriers that is modulated in accordance with the second modulation order Another innovative aspect of the subject matter described in this disclosure can be implemented in a non-transitory computer-readable medium storing instructions that, when executed by a processor, cause the processor to perform operations including transmitting, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and transmitting, to the UE, a first signal on the first set of subcarriers that is modulated in accordance with the first modulation order and concurrently transmitting a second signal on the second set of one or more subcarriers that is modulated in accordance with the second modulation order.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports selection of modulation orders that may be associated with resiliency against spur impairment according to one or more aspects.

FIG. 7 is a flow diagram illustrating an example process that supports selection of modulation orders that may be associated with resiliency against spur impairment according to one or more aspects.

Like reference numbers and designations in the various drawings indicate like elements.

DETAILED DESCRIPTION

Figure 1:
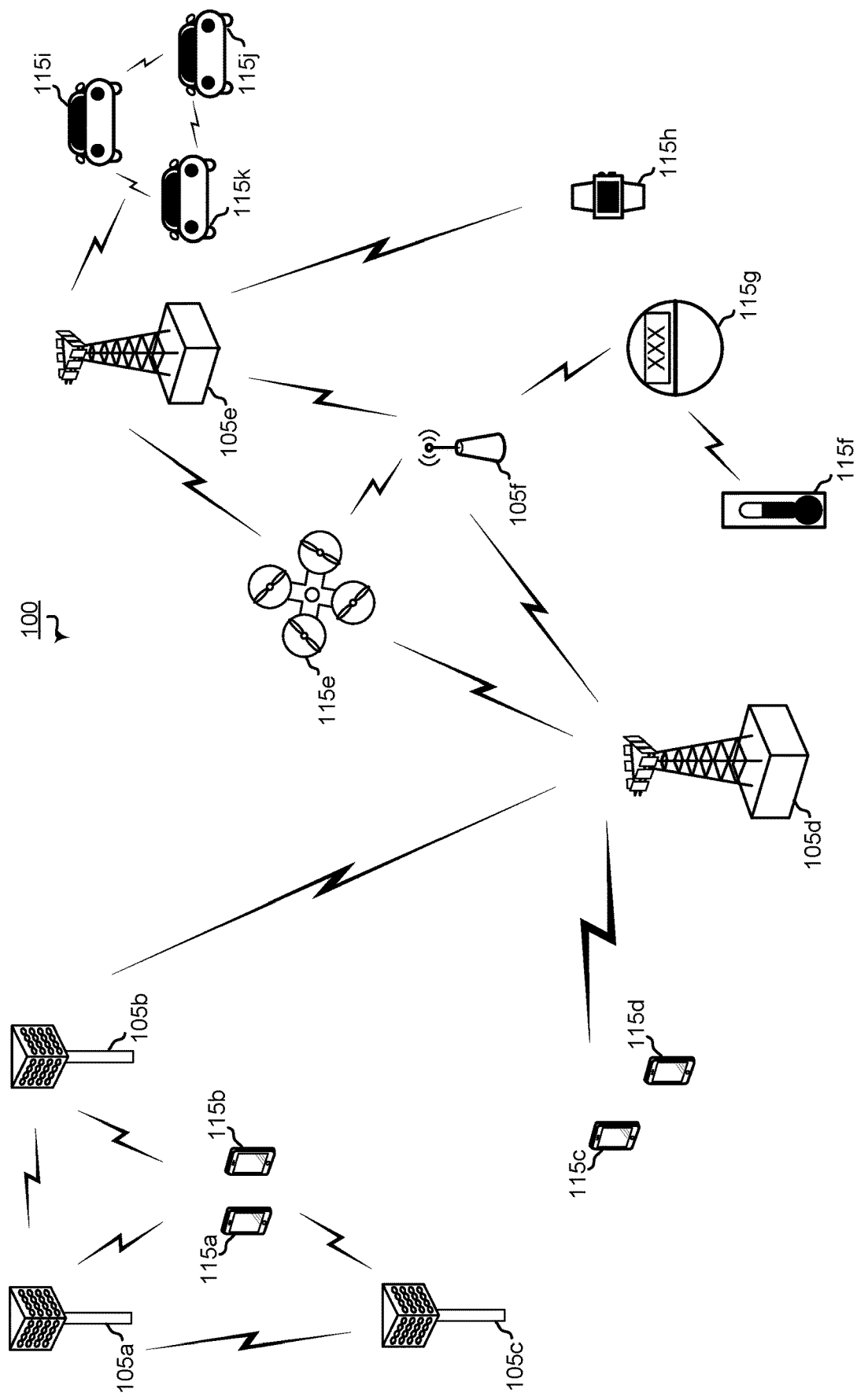
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for selection of modulation orders that may be associated with resiliency against spur impairment. For example, a first modulation and coding scheme (MCS) having a first modulation order may be used to modulate and demodulate signals transmitted and received on a first set of subcarriers, while a second MCS having a second modulation order may be used to modulate and demodulate signals transmitted on a second set of subcarriers, the second set of subcarriers being a set of subcarriers associated with one or more RF spurs. Modulation orders associated with sets of subcarriers may be selected by a base station and indicated, by the base station, to a UE for use by the UE in demodulating signals received from the base station on the respective subcarriers. As one example, a higher modulation order may be used for modulation and demodulation of signals transmitted on subcarriers that are not associated with RF spurs, while a lower modulation order may be used for modulation and demodulation of signals transmitted on subcarriers that are associated with RF spurs. Thus, different respective modulation schemes having different respective modulation orders may be used for modulation and demodulation of signals on subcarriers associated with RF spurs and subcarriers not associated with RF spurs.

Particular implementations of the subject matter described in this disclosure can be implemented to realize one or more of the following potential advantages. In some aspects, the present disclosure provides for use of higher order modulation schemes in environments where RF spur impairment is present through use of lower order modulation and coding schemes, such as modulation and coding schemes up to 256 QAM, on subcarriers associated with RF spurs and higher order modulation and coding schemes, such as 4k or 16k QAM modulation and coding schemes, on subcarriers not associated with RF spurs. Furthermore, use of different modulation and coding schemes may allow for a signal to noise ratio (SNR) or difference between signal level and noise level associated with each modulation and coding scheme to be maintained, as SNRs or differences between signal levels and noise levels required for reliable communication using high modulation orders may be greater than SNRs or differences between signal levels and noise levels required for reliable communication using lower modulation orders.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~ 1 millisecond (ms)), and users with wide ranges of mobility or lack thereof; and (3) with enhanced mobile broadband including extreme high capacity (such as ~ 10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (cMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115c, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115*i*-115*k* communicating with the macro base station 105*c*.

Figure 2:
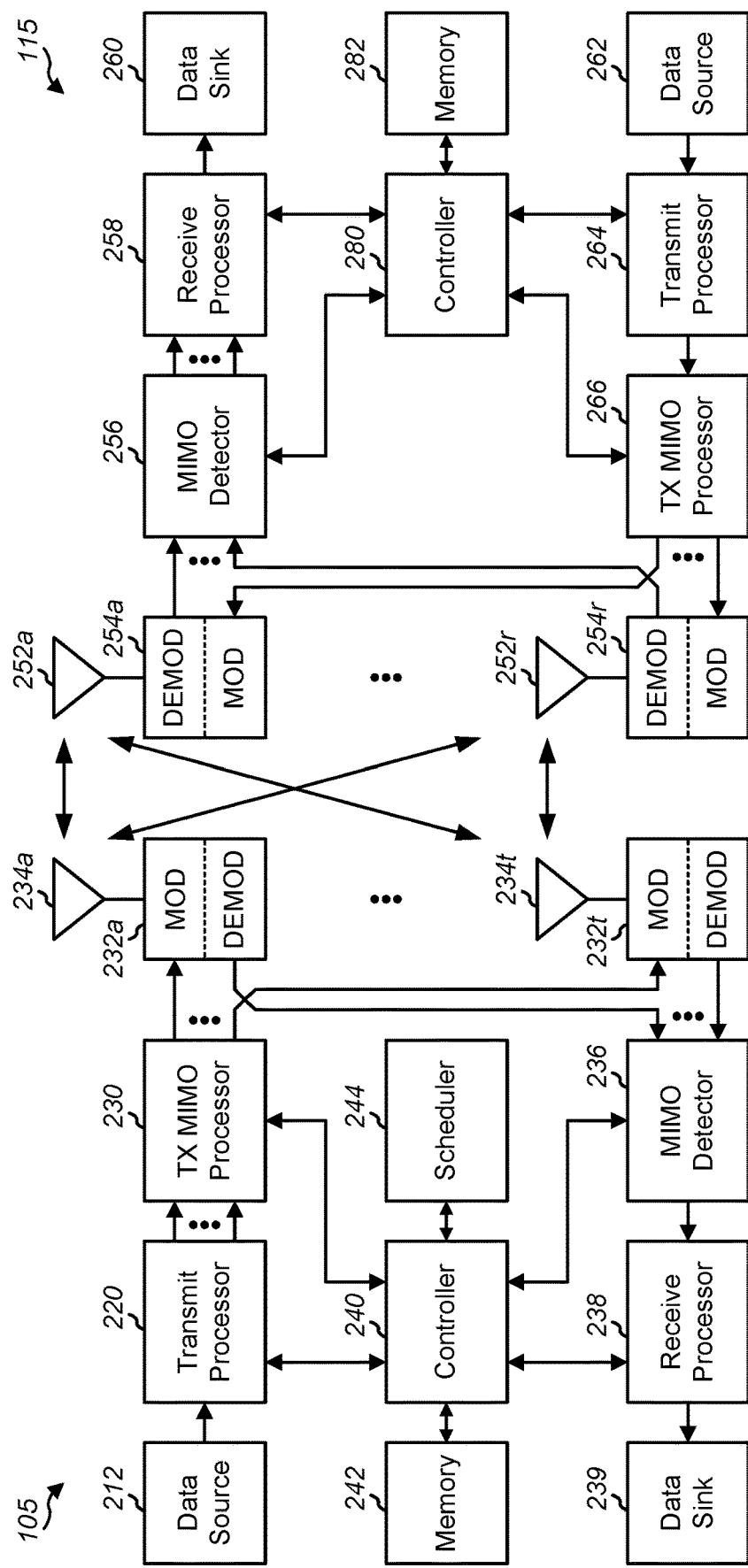
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105*f* in FIG. 1, and the UE 115 may be the UE 115*c* or 115*d* operating in a service area of the base station 105*f*, which in order to access the small cell base station 105*f*, would be included in a list of accessible UEs for the small cell base station 105*f*. Additionally, the base station 105 may be a base station of some other type. As shown in FIG. 2, the base station 105 may be equipped with antennas 234*a* through 234*t*, and the UE 115 may be equipped with antennas 252*a* through 252*r* for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254*a* through 254*r*, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254*a* through 254*r* (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 5-7, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
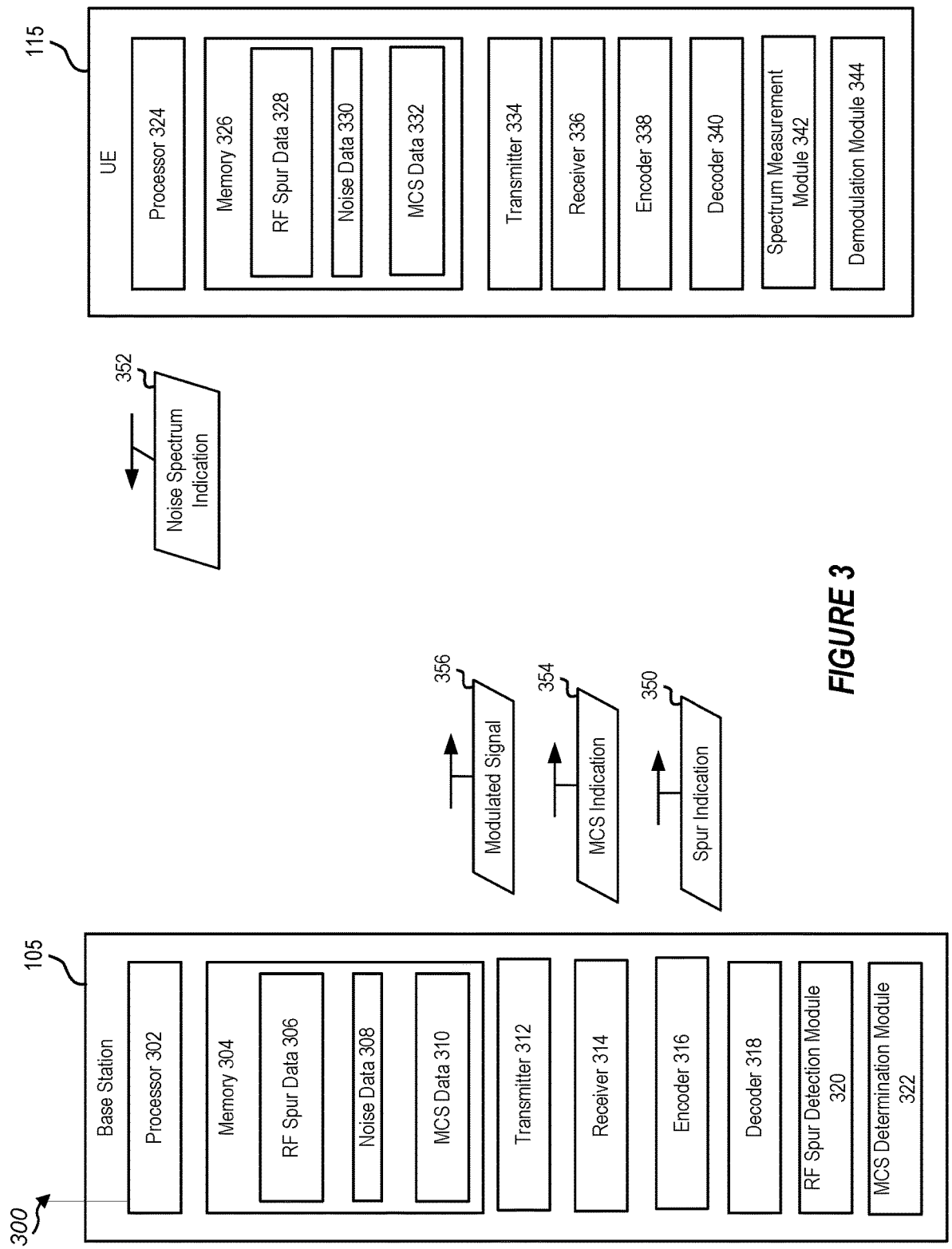
FIG. 3 is a block diagram illustrating an example wireless communication system that supports selection of modulation orders that may be associated with resiliency against spur impairment according to one or more aspects.

FIG. 3 is a block diagram of an example wireless communications system 300 that supports selection of modulation orders that may be associated with resiliency against spur impairment according to one or more aspects. In some examples, the wireless communications system 300 may implement aspects of the wireless network 100. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 324 (hereinafter referred to collectively as "the processor 324"), one or more memory devices 326 (hereinafter referred to collectively as "the memory 326"), one or more transmitters 334 (hereinafter referred to collectively as "the transmitter 334"), and one or more receivers 336 (hereinafter referred to collectively as "the receiver 336"). The processor 324 may be configured to execute instructions stored in the memory 326 to perform the operations described herein. In some implementations, the processor 324 includes or corresponds to one or more of the receive processor 258, the transmit processor 264, and the controller 280, and the memory 326 includes or corresponds to the memory 282.

The memory 326 includes or is configured to store RF spur data 328, noise data 330, and MCS data 332. RF spur data 328 may, for example, include information regarding one or more RF spurs associated with base station 105, such as information regarding frequencies and/or subcarriers impacted by the RF spurs, a level of each of the RF spurs, and other information regarding RF spurs associated with the base station 105. Noise data 330 may include information regarding noise measured by the UE 115, such as a power level of a signal measured by the UE 115, a power level of noise measured by the UE 115, a difference between a level of a signal measured by the UE 115 and a level of noise measured by the UE 115, or an SNR calculated by the UE based on a signal measured by the UE 115 and noise measured by the UE 115. In some embodiments, noise data 330 may include an average SNR across a range of frequencies or subcarriers or a difference between an average signal level and an average noise level over a range of frequencies or subcarriers. For example, the range of frequencies or subcarriers may be a range of frequencies or subcarriers that is not associated with one or more RF spurs. The MCS data 332 may, for example, include one or more MCSs and one or more associated sets of subcarriers for each respective MCS, indicated to the UE 115 by the base station 105.

The transmitter 334 is configured to transmit reference signals, control information and data to one or more other devices, and the receiver 336 is configured to receive references signals, synchronization signals, control information and data from one or more other devices. For example, the transmitter 334 may transmit signaling, control information and data to, and the receiver 336 may receive signaling, control information and data from, the base station 105. In some implementations, the transmitter 334 and the receiver 336 may be integrated in one or more transceivers. Additionally or alternatively, the transmitter 334 or the receiver 336 may include or correspond to one or more components of the UE 115 described with reference to FIG. 2. The UE 115 may further include a spectrum measurement module 342 for measuring a signal level and a noise level for one or more frequencies and/or subcarriers and for determining an SNR or a difference between the signal level and the noise level. The UE 115 may include a demodulation module 344 for demodulating signals received from the base station 105 on one or more subcarriers using modulation and coding schemes indicated as being associated with the subcarriers in the MCS data 332.

The base station 105 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 312 (hereinafter referred to collectively as "the transmitter 312"), and one or more receivers 314 (hereinafter referred to collectively as "the receiver 314"). The processor 302 may be configured to execute instructions stored in the memory 304 to perform the operations described herein. In some implementations, the processor 302 includes or corresponds to one or more of the receive processor 238, the transmit processor 220, and the controller 240, and the memory 304 includes or corresponds to the memory 242.

The memory 304 includes or is configured to store RF spur data 306, noise data 308, and MCS data 310. RF spur data 306 may include information regarding one or more RF spurs detected and/or measured by the base station 105. Such RF spur data 306 may, for example, include frequencies or subcarriers and levels associated with spurs associated with the base station 105. Such RF spurs may be detected offline during factory calibration of the base station 105 or may be detected by the base station 105 during operation. RF spur data 306 may further include levels of detected spurs, and other information regarding detected spurs. Noise data 308 may, for example, include noise measured by the UE 115 or other UEs, such noise levels measured by the UE 115, signal levels measured by the UE 115, SNRs calculated by the UE 115, differences between noise and signal levels calculated by the UE 115, and other information regarding noise measured by the UE 115. MCS data 310 may, for example, include one or more modulation and coding schemes having particular modulation orders. MCS data 310 may further include information regarding when particular MCSs having particular modulation orders should be associated with particular frequencies For example, the MCS data 310 may include information for assigning particular MCSs to subcarriers or frequencies on which spurs are detected, such as information for assigning particular MCSs to subcarriers or frequencies on which spurs of a particular level are detected. Likewise, the MCS data 310 may include information for assigning particular MCSs to subcarriers or frequencies on which spurs are not detected. In some embodiments, MCS data 310 may include information for assigning particular MCSs to subcarriers or frequencies on which spurs are detected and other MCSs to subcarriers or frequencies on which spurs are not detected when a particular SNR or difference between a noise level and signal level for one or more frequencies or subcarriers is signaled to the base station 105 by the UE 115.

The transmitter 312 is configured to transmit reference signals, synchronization signals, control information and data to one or more other devices, and the receiver 314 is configured to receive reference signals, control information and data from one or more other devices. For example, the transmitter 312 may transmit signaling, control information and data to, and the receiver 314 may receive signaling, control information and data from, the UE 115. In some implementations, the transmitter 312 and the receiver 314 may be integrated in one or more transceivers. Additionally or alternatively, the transmitter 312 or the receiver 314 may include or correspond to one or more components of base station 105 described with reference to FIG. 2. The base station 105 may include an RF spur detection module 320 for detecting one or more spurs on one or more frequencies and/or subcarriers. Such detection may, in some embodiments, be performed by the base station 105, or by another device, while the base station 105 is offline, such as during factory calibration before deployment of the base station 105. In some embodiments, an external device, such as a spectrum analyzer, may be used to generate a power spectrum density of noise related to the base station 105 during factory calibration. The RF spur detection module 320 of the base station may detect spurs based on noise indicated by the power spectrum density of noise exceeding a threshold level at one or more frequencies. For example, in some embodiments the RF spur detection module 320 may determine one or more frequencies and/or subcarriers associated with one or more RF spurs and/or one or more levels of one or more RF spurs. In some embodiments, such RF spur detection may be performed external to the base station 105 and RF spurs may be stored in RF spur data 306 without detection of RF spurs performed by the base station 105. The base station 105 may include an MCS determination module 322 for determining one or more modulation and coding schemes to be associated with one or more frequencies and/or subcarriers as described herein.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

During operation of the wireless communications system 300, the base station 105 may determine one or more frequencies at which one or more RF spurs associated with the base station 105 are located. Such determination may be made based on RF spur data 306 stored in the memory pf the base station 105 and generated during a factory calibration phase of production of the base station 105. In some embodiments, the base station 105 itself may measure noise associated with one or more subcarriers and/or frequencies to detect one or more spurs associated with the base station, such as by the RF spur detection module 320. The base station may transmit a spur indication 350 to the UE 115 to notify the UE of one or more frequencies and/or subcarriers associated with the spurs. The information included in the spur indication 350 may be included in the RF spur data 328. The UE 115 may measure, by the spectrum measurement module 342, noise and signal levels associated with one or more frequencies and/or subcarriers not impacted by the RF spurs indicated by the spur indication 350. The UE 115 may, by the spectrum measurement module 342 calculate a SNR or difference between a signal level and a noise level, such as an average SNR or an average difference over a plurality of frequencies and/or subcarriers not associated with one or more RF spurs. Such measured and/or calculated values may be included in noise data 330. The UE 115 may transmit a noise spectrum indication 352 indicating the calculated SNR, difference, or other noise data 330. The base station 105 may receive the noise spectrum indication 352 and store the information included in the noise spectrum indication as noise data 308. The MCS determination module 322 of the base station 105 may determine MCSs to be associated with different frequencies and/or subcarriers in accordance with the received noise spectrum indication 352. For example, the base station 105 may determine whether a power of a spur is greater than a difference included in the noise spectrum indication 352. If the power of the spur is less than the difference included in the noise spectrum indication 352, a same modulation order may be associated with subcarriers associated the RF spur and subcarriers not associated with RF spur. If the power of the spur is greater than or equal to the difference, different modulation orders may be associated with subcarriers associated with the RF spur and subcarriers not associated with the RF spur. Thus, the MCS determination module 322 may assign MCSs to particular subcarriers based on a relationship between a spur level and a reported difference between a signal level and a noise level. The base station 105 may transmit an MCS indication 354 to the UE 115. The MCS indication 354 may include an indication of multiple MCSs associated with multiple respective subcarriers. Likewise, the base station may transmit a modulated signal 356. The modulated signal 356 may, for example, include a first signal on a first set of one or more subcarriers modulated using a first MCS and a second signal on a second set of one or more subcarriers, such as a second set of one or more subcarriers associated with an RF spur, associated with a second MCS. The UE 115 may demodulate the modulated signal 356 in accordance with the MCS indication 354, such as using the demodulation module 324. In some embodiments, the UE 115 may store the information of the MCS indication as MCS data 332. Thus, the UE 115 may demodulate signals received on different subcarriers using different MCSs, and the MCSs may be associated with the subcarriers in accordance with presence of an RF spur, or lack thereof, on the subcarriers.

As described with reference to FIG. 3, the present disclosure provides techniques for use of high order MCSs in spur-impacted environments. Use of different modulation and coding schemes on subcarriers impacted by spurs and subcarriers not impacted by spurs may allow for use of high order MCSs on frequencies on subcarriers not impacted by spurs and lower order MCSs on subcarriers impacted by spurs, rather than lower order MCSs on all subcarriers when spurs are present. Use of high order MCSs may enhance efficiency and reliability of communication.

Figure 4:
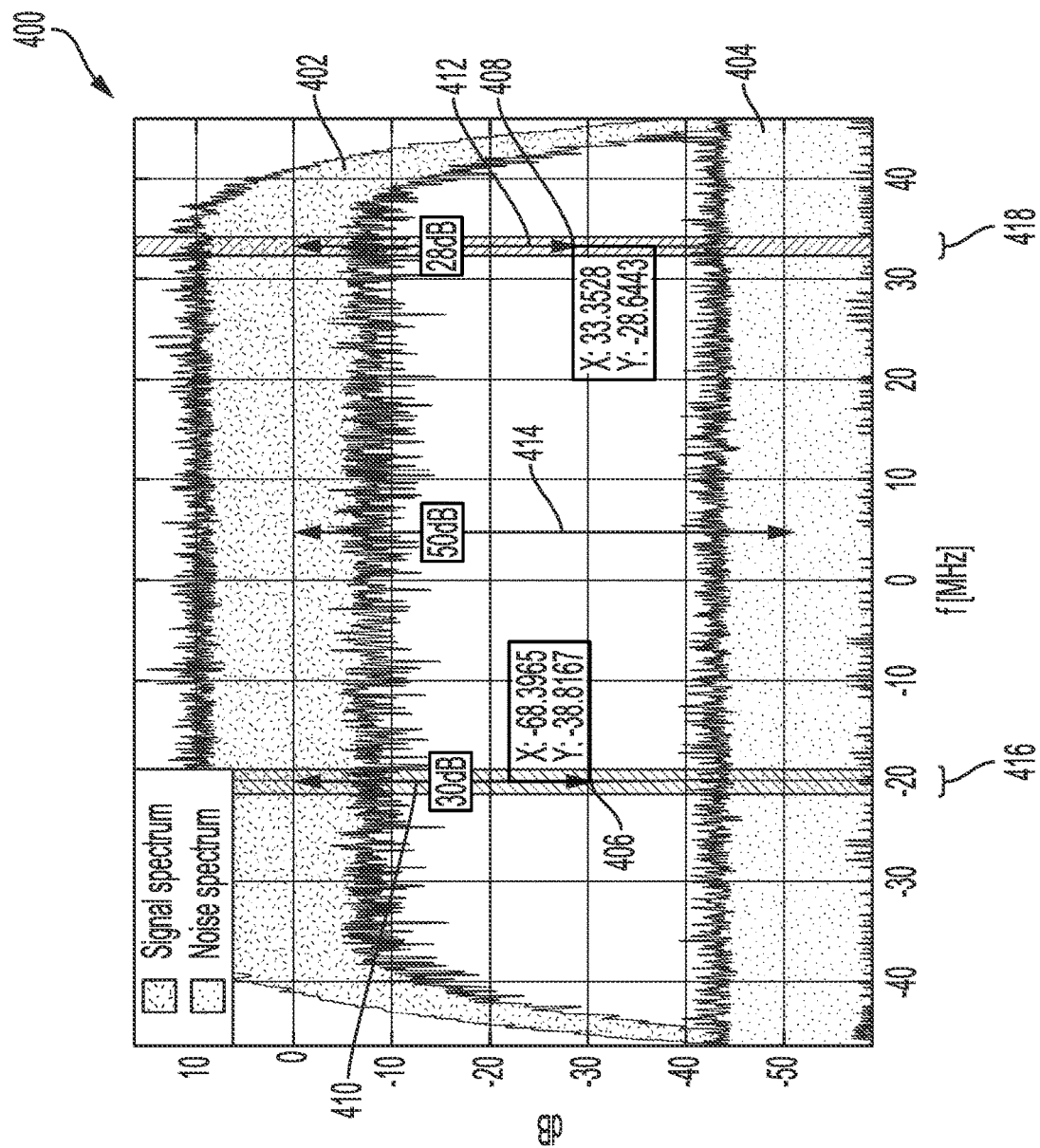
FIG. 4 is a graph of a signal spectrum and noise spectrum according to one or more aspects.

FIG. 4 is a graph 400 showing a signal spectrum 402 and a noise spectrum 404 over a bandwidth according to one or more aspects. The graph 400 may, for example, show a power level, in dB, of a signal spectrum 402 and a noise spectrum 404 over a range of frequencies, such as a power spectrum density of the noise spectrum 404 and the signal spectrum 402. As shown in FIG. 4, spurs may occur at particular frequencies which may be located in particular sets of one or more subcarriers. As one particular example, a first RF spur with a power level at point 406 may occur in a first subcarrier set 416. A second RF spur with a power level at point 408 may occur in a second subcarrier set 418. Thus, spurs at different frequencies may have different power levels. RF spurs may, for example, be RF impairments that cause spikes in a noise spectrum 404. Such spurs may, for example, be caused by unsynchronized clocks in a base station or other aspects of a base station or environment in which a base station in communication with a UE is operating. In some cases, spurs may be calibrated to enable reception of modulated data, such as data modulated using MCSs having orders of up to 256 QAM. However, for use of higher order MCSs, such as 4k or 16k QAM MCSs, a desired difference between a power level of the noise spectrum and a power level of the signal spectrum may be high and/or a desired SNR may be high. Thus, spurs may negatively impact communication between a base station and a UE when using higher order MCSs, as a difference between a power level of the spur and the power level of the signal spectrum may be lower than a desired difference. In particular, spurs' power may increase a noise floor at subcarriers on which the spurs are located. Thus, as shown in FIG. 4, spurs may cause an average power level of a noise spectrum to vary.

As one particular example, at the first spur on the first subcarrier set 416, a difference between a signal power level and a spur power level may be 30 dB. At the second spur on the second subcarrier set 418, a difference between a signal power level and a spur power level may be 28 dB. The difference between the spur power level and the signal power level may, for example, be a difference between a signal spectrum mean and a top value of a spur. At frequencies outside of the two subcarrier sets associated with the spurs, an average difference between the power level of the signal spectrum 402 and the noise spectrum 404 may be 50 dB. Thus, a difference between a power level of the signal spectrum 402 and the noise spectrum 404 may be greater at frequencies on which spurs are not located than at frequencies on which spurs are located. Lower differences between a power level of the signal spectrum 402 and a power level of the noise spectrum 404, such as differences below a threshold, may make it difficult or impossible to demodulate signals modulated using higher modulation orders, such as 4k or 16k QAM. Thus, for subcarriers associated with spurs, such as the first set of subcarriers 416 and the second set of subcarriers 418, lower modulation orders may be used to modulate signals, while higher modulation orders may be used to modulate signals transmitted on other subcarriers.

Figure 5:
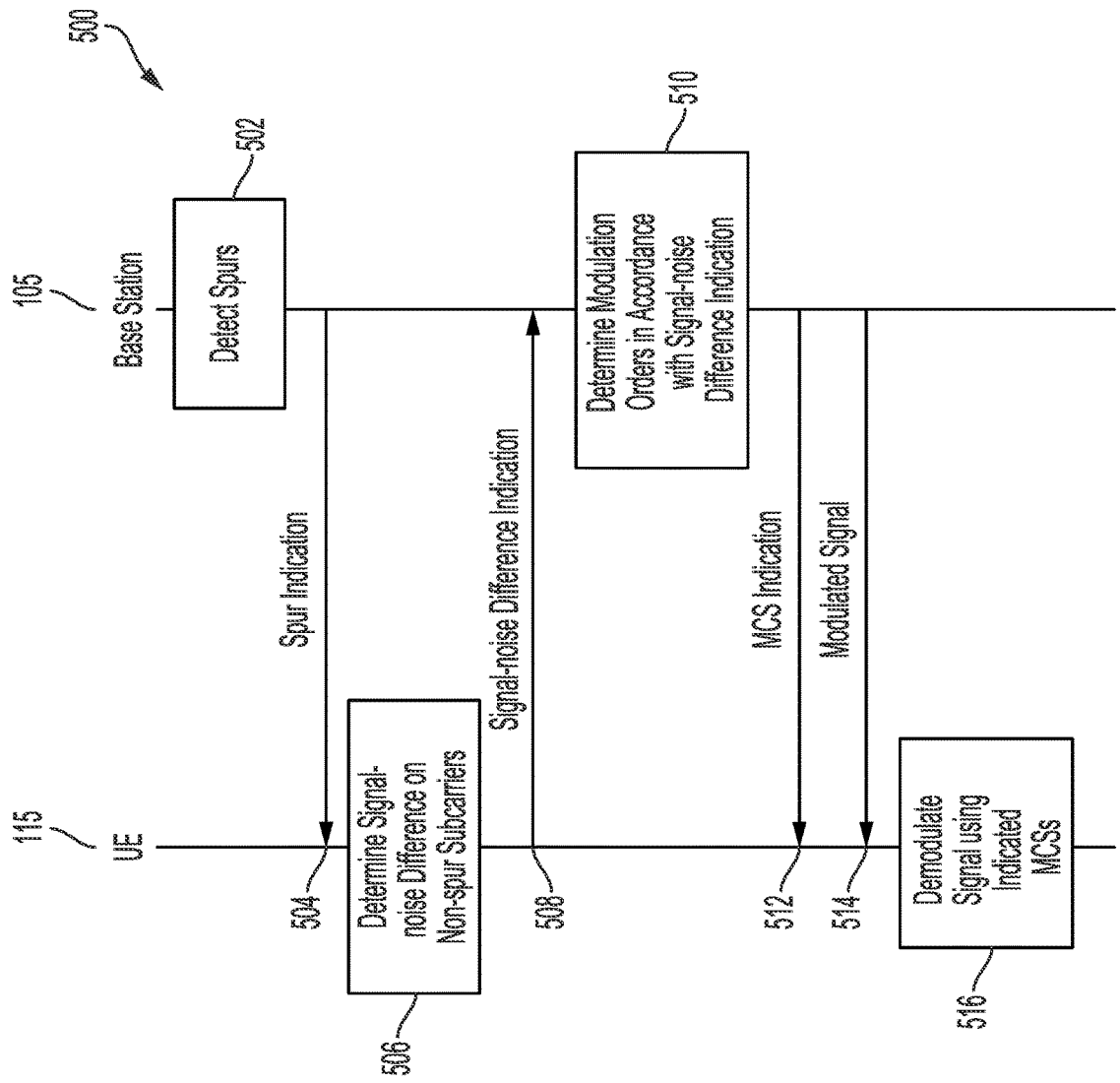
FIG. 5 is an example flow diagram illustrating an example wireless communication system that supports selection of modulation orders that may be associated with resiliency against spur impairment according to one or more aspects.

FIG. 5 is a flow diagram 500 illustrating example communication between a UE 115 and a base station 105 for use of MCSs having different modulation orders for subcarriers associated with RF spurs and for subcarriers not associated with RF spurs. At block 502, one or more RF spurs associated with the base station 105 may be detected. In some embodiments, the base station 105 may detect the one or more RF spurs. As one particular example, the base station 105 may detect RF spurs associated with the base station using measurement data of a noise spectrum associated with the base station 105 received from the UE 115 or another external device, such as a spectrum analyzer. In some embodiments an external device may detect the one or more RF spurs and may indicate the one or more RF spurs to the base station 105. Detecting the RF spurs may include determining one or more frequencies at which RF spurs associated with the base station 105 are located by measuring a power level of a noise spectrum at the frequencies at which the RF spurs are located. In some embodiments, measuring a power level of the RF spurs may include determining a difference between a signal level and a noise level for frequencies at which RF spurs are located. Measurement of a power level of noise associated with the base station 105 to detect RF spurs may, for example, be performed while the base station 105 is offline, such as during factory calibration before deployment. Such measurement may, for example, be performed using lab equipment, such as a spectrum analyzer to achieve a high level of accuracy of measurement of the spur level. For example, a spectrum analyzer may provide high accuracy of measurement over very narrow bandwidths, such as one or two reference blocks, and/or single slot measurements. Thus measuring the RF spurs at 502 may include generating a power spectrum density plot of noise associated with the base station 105, such as shown in noise spectrum 404 of FIG. 4. A determination may then be made of frequencies on which spurs are located, such as by determining frequencies at which the noise spectrum exceeds a threshold power level. In some embodiments, the base station 105 and/or UE 115 may also measure spurs associated with the base station after deployment.

At 504, the base station 105 may transmit a spur indication to the UE 115. The spur indication may include an indication of one or more frequencies on which spurs associated with the base station 105 are located. The spur indication may, for example, indicate one or more sets of one or more subcarriers on which spurs are located. In some embodiments, the spur indication may further include a power level of each of the indicated spurs.

At 506, the UE 115 may determine a signal-noise difference on one or more non-spur subcarriers. Non-spur subcarriers may be subcarriers on which spurs were not detected at 502. For example, the UE 115 may measure a signal level and a noise level on subcarriers not indicated by the spur indication at 504. Such measurement may, for example, include determining an average signal level and an average noise level for subcarriers within a set of subcarriers that are not indicated by the spur indication, such as all subcarriers of a set of subcarriers on which spurs are not located. In some embodiments determining the signal level and the noise level may include calculating a power spectrum density of noise, such as noise spectrum 404 of FIG. 4 and a power spectrum density of a signal, such as signal spectrum 402 of FIG. 4. To determine the signal-noise difference on the one or more non-spur frequencies, the UE may determine a difference between a measured or estimated signal level and a measured or estimated noise level on the one or more non-spur subcarriers. As one example, determining the difference may include estimating a noise spectrum and comparing the noise spectrum to a measured received signal spectrum. In some embodiments, such a difference may be an average difference across multiple non-spur subcarriers. Such a difference may, for example, include a reference thermal noise power. In some embodiments, the UE 115, alternatively or additionally, calculate an SNR for the non-spur subcarriers. In some embodiments, a difference and/or SNR may be calculated for each of the non-spur subcarriers.

At 508, the UE 115 may transmit a noise spectrum indication to the base station 105. The noise spectrum indication may, for example, include the difference and/or SNR determined at 506. In some embodiments, a difference and/or an SNR may be included for each of multiple non-spur subcarriers. In some embodiments a single difference and/or an SNR may be included for all subcarriers of a set of subcarriers that are not associated with one or more RF spurs. In some embodiments, the noise spectrum indication may be transmitted in a channel state feedback message.

At 510, the base station may determine one or more modulation orders in accordance with the received signal-noise difference indication. For example, the base station may determine a modulation order of an MCS to be used in modulating data transmitted on one or more subcarriers associated with one or more spurs, such as subcarriers associated with spur frequencies determined at 502, and a modulation order of an MCS to be used in modulating data transmitted on one or more subcarriers not associated with one or more spurs, such as all other subcarriers of a set of subcarriers for communication between the base station 105 and the UE 115. In particular a determination of modulation orders to be associated with different sets of subcarriers may include a determination of whether to associate different modulation orders with different sets of subcarriers or whether to associate a same modulation order with multiple sets of subcarriers. Such a determination may include determining whether a received difference between one or more signal levels and one or more noise levels of one or more non-spur subcarriers is greater than a power level of one or more spurs, such as greater than a difference between a signal level and a noise level at a spur frequency. If the difference between the signal levels and the noise levels of the non-spur subcarriers is greater than the difference between the signal level and the noise level of the spur frequency, different MCSs with different modulation orders may be configured for subcarriers associated with RF spurs and for subcarriers not associated with RF spurs. If the difference between the signal levels and the noise levels of the non-spur subcarriers is not greater than the difference between the signal level and the noise level of the spur frequency, a same modulation order may be used for all subcarriers. The difference between the signal levels and noise levels of the non-spur carriers may, for example, be a difference between a signal spectrum mean and a noise spectrum mean for all non-spur subcarriers of a signal spectrum. In some embodiments, one or more SNRs for one or more non-spur subcarriers may be similarly compared with one or more SNRs for one or more spur subcarriers to determine whether different MCSs or a same modulation order may be used. If the SNR for the non-spur subcarriers is greater than the SNR for the spur subcarriers, different MCSs may be used for spur and non-spur subcarriers, and if the SNR for the non-spur subcarriers is less than or equal to the SNR for the spur subcarriers, a same modulation order may be used for all subcarriers.

When different modulation orders are used for spur subcarriers and non-spur subcarriers, a modulation order to be used may be determined in accordance with the below Formula 1.

$$N(SINR) = \text{floor}\left(\frac{SINR[\text{dB}] = TH[\text{dB}]}{3}\right) \quad (1)$$

In equation 1, N is a number of transmitted bits per subcarrier, such as 10 bits per subcarrier for 1024 QAM, SINR is an SNR for a spur carrier or a difference between a signal level and a noise level for a spur carrier, and TH is a guard interval. Thus, a floor for a number of bits per subcarrier may be determined according to an SNR or a difference between a signal level and a noise level for a spur frequency or non-spur frequency, and a modulation order for an MCS for use on one or more subcarriers including the spur frequency may be determined based on the floor. An example table of associated N values, SINR values, and frequency intervals is shown below in Table 1.

TABLE 1

| Frequency Interval [MHz] | SINR[dB] | N |
|---|---|---|
| [−20.25, −19.75] | 28 | 7 (e.g., 128 QAM) |
| [33, 33.6] | 30 | 8 (e.g., 256 QAM) |
| Otherwise | 50 | 14 (e.g., 16k QAM) |

Thus, as shown in Table 1, spurs may be detected on frequency ranges −20.25, −19.75 MHz and 33, 33.6 MHz. A difference between a signal level and a noise level for the spur in frequency range −20.25, −19.75 MHZ, such as frequency range 418, may be 28 dB, and a difference between a signal level and a noise level for the spur in frequency range 33, 33.6 MHz, such as frequency range 416, may be 30 dB. An average difference between a signal level and a noise level for other frequencies, such as for non-spur frequencies may be 50 dB. Thus, according to formula 1, a number of transmitted bits per subcarrier for the frequency range −20.25, −19.75 MHz may be 7, a number of transmitted bits per subcarrier for the frequency range 33, 33.6 MHz may be 8, and a number of transmitted bits per subcarrier for non-spur frequency ranges may be 14. Thus, for one or more subcarriers associated with the frequency range −20.25, −19.75 MHz, a modulation order including 7 or fewer bits per subcarrier, such as a 128 QAM modulation order, may be assigned. For one or more subcarriers associated with the frequency range 33, 33.6 MHz, a modulation order including 8 or fewer bits per subcarrier, such as a 256 QAM modulation order, may be assigned. For all other subcarriers a modulation order including 14 or fewer bits per subcarrier, such as a 16k QAM modulation order, may be assigned. Thus, in some embodiments, different modulation orders may be determined for subcarriers on which spurs are detected and subcarriers on which spurs are not detected, and, in some embodiments, different modulation orders may be determined for different spurs having varying differences between signal and noise levels.

At 512, the base station 105 may transmit a MCS indication to the UE. The MCS indication may include a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, where the second set of one or more subcarriers is associated with an RF spur. In some embodiments, the MCS indication may include more than two indications of sets of subcarriers and associated modulation orders. In some embodiments the information of Table 1 may be included in the MCS indication. In some embodiments, instead of values, the MCS indication may include indications of MCSs corresponding to the N values. In some an indication of one or more sets of subcarriers associated with one or more modulation schemes may include an indication of one or more frequency ranges corresponding to the one or more sets of subcarriers. In some embodiments, the MCS indication may be included in a downlink PDCCH transmission.

At 514, the base station 105 may transmit one or more modulated signals to the UE 115. For example, the base station 105 may transmit a first signal modulated with an MCS of a first order on a first set of subcarriers associated with the first order and a second signal modulated with an MCS of a second order on a second set of subcarriers associated with the second order. The base station 105 may further transmit additional modulated signals on additional sets of subcarriers associated with additional modulation orders.

At block 516, the UE 115 may demodulate the received signals in accordance with the received MCS indication. For example, a demodulation slicer for a demodulation of a signal received on a set of subcarriers may be determined based on a received indication of a modulation order associated with the set of subcarriers.

FIG. 6 is a flow diagram illustrating an example process 600 that supports selection of modulation orders that may be associated with resiliency against spur impairment according to one or more aspects. Operations of the process 600 may be performed by a UE, such as the UE 115 described above with reference to FIGS. 1-3 or a UE as described with reference to FIG. 8. For example, example operations (also referred to as "blocks") of the process 600 may enable the UE 115 to demodulate signals transmitted by a base station on different sets of subcarriers using different modulation schemes.

In block 602, the UE may receive, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first RF spur of a signal spectrum associated with the network node. For example, the first indication may include an indication of a first frequency range associated with the first set of subcarriers or a direct indication of the first set of subcarriers. The first frequency range may, for example, be a frequency range of a bandwidth that is not associated with one or more RF spurs. The first indication may further include a direct indication of the first modulation order or an indication of a number of bits per subcarrier associated with the first modulation order. The second indication may include an indication of a second frequency range associated with the second set of subcarriers or a direct indication of the second set of subcarriers. The second frequency range may, for example, be a frequency range of a bandwidth that is associated with one or more RF spurs, such as a frequency range of one or more subcarriers including a frequency at which a spur is detected. The first indication may further include a direct indication of the second modulation order or an indication of a number of bits associated with the second modulation order.

In block 604, the UE may demodulate a first signal received on the first set of one or more subcarriers in accordance with the first modulation order and a second signal concurrently received on the second set of one or more subcarriers in accordance with the second modulation order. Thus, the UE may demodulate signals received on subcarriers in accordance with received indications that the subcarriers are associated with particular modulation orders.

In some embodiments, the UE of the method 600 may receive, from a network node before receiving the first and second indications, a third indication of a third set of one or more subcarriers with which one or more RF spurs, including the first RF spur, are associated. The second set of one or more subcarriers may comprise at least a portion of the third set of one or more subcarriers. In particular, the network node, such as the base station, may indicate to the UE one or more sets of one or more subcarriers, with each set of subcarriers being associated with a spur. Thus, the third set of subcarriers may include sets of subcarriers that are each associated with a respective RF spur, such as a respective RF spur detected before deployment of the network node. One of the respective RF spurs may, for example, be the first RF spur, and thus the second set of one or more subcarriers, associated with the first RF spur, may include at least a portion of the third set of one or more subcarriers. The third indication may allow the UE to calculate a difference between a signal level and a noise level for a fourth set of one or more subcarriers that does not overlap with the third set of one or more subcarriers. For example, the fourth set of one or more subcarriers may be a set of subcarriers that is not associated with RF spurs, such as a set of subcarriers that are not impacted by RF spurs. In some embodiments, the fourth set of one or more subcarriers may include all subcarriers of a bandwidth that are outside of the subcarriers of the third set of one or more subcarriers, such as all subcarriers of the bandwidth that are not associated with RF spurs. Thus, the UE may calculate a difference between a signal level and a noise level for subcarriers that are not associated with RF spurs. The UE may then transmit a fourth indication of the calculated difference to the network node. The network node may use the calculated difference to determine modulation orders for assignment to the first and second sets of subcarriers, such as for assignment of modulation orders to a first set of subcarriers that is not associated with an RF spur and a second set of subcarriers that is associated with an RF spur. Then, as described with respect to blocks 602 and 604, the network node may transmit the first and second indications of the first set of subcarriers and the first modulation order and the second set of subcarriers and the second modulation order.

FIG. 7 is a flow diagram illustrating an example process 700 that supports selection of modulation orders that may be associated with resiliency against spur impairment according to one or more aspects. Operations of the process 700 may be performed by a base station, such as the base station 105 described above with reference to FIGS. 1-3 or a base station as described with reference to FIG. 9. For example, example operations of the process 700 may enable the base station 105 to indicate modulation orders associated with particular sets of subcarriers to a UE.

In block 702, the base station may transmit, to a UE, a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a radio frequency (RF) spur of a signal spectrum associated with the network node. The first and second indication of block 702 may be the first and second indication received at block 602 of FIG. 6. The first and second modulation orders may be associated with the first and second sets of subcarriers in accordance with a determination of a relationship between a first difference between a signal level and a noise level for one or more subcarriers on which spurs are not detected and a second difference between a signal level and a noise level for a subcarrier on which one or more subcarriers are detected, such as described with respect to FIG. 5. In some embodiments the first and second modulation orders may be determined based on a difference between a signal level and a noise level for the respective set of subcarriers, as described with respect to Equation 1.

In block 704, the base station may transmit, to the UE, a first signal on the first set of subcarriers that is modulated in accordance with the first modulation order and concurrently transmit a second signal on the second set of one or more subcarriers that is modulated in accordance with the second modulation order. For example, the base station may modulate signals transmitted on sets of subcarriers in accordance with the modulation orders associated with the subcarriers, such as using MCSs having the associated modulation orders.

Figure 8:
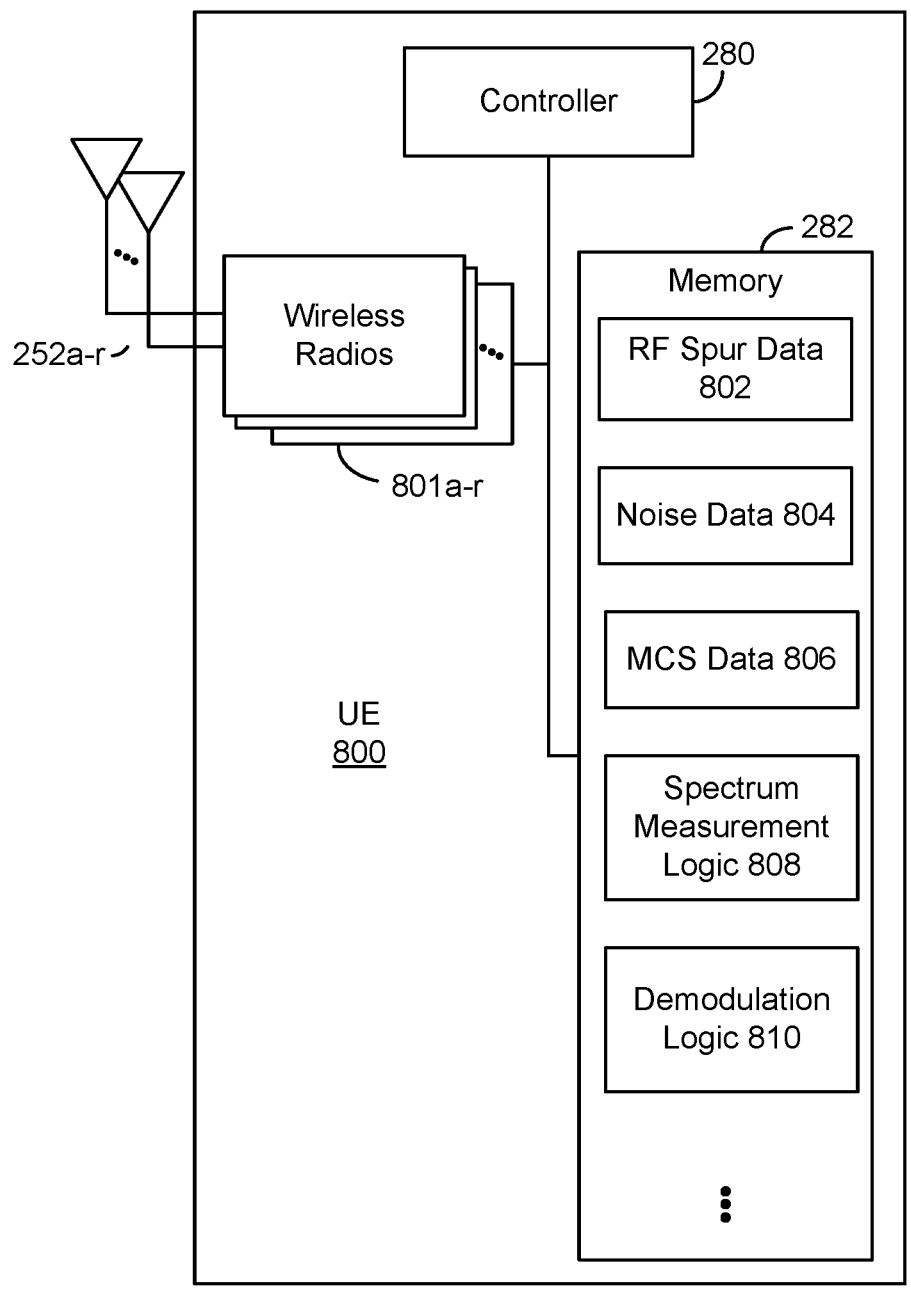
FIG. 8 is a block diagram of an example UE that supports selection of modulation orders that may be associated with resiliency against spur impairment according to one or more aspects.

FIG. 8 is a block diagram of an example UE 800 that supports selection of modulation orders that may be associated with resiliency against spur impairment according to one or more aspects. The UE 800 may be configured to perform operations, including the blocks of the process 600 described with reference to FIG. 6 and/or one or more blocks of the process 500 described with reference to FIG. 5. In some implementations, the UE 800 includes the structure, hardware, and components shown and described with reference to the UE 115 of FIG. 2 or 3. For example, the UE 800 includes the controller 280, which operates to execute logic or computer instructions stored in the memory 282, as well as controlling the components of the UE 800 that provide the features and functionality of the UE 800. The UE 800, under control of the controller 280, transmits and receives signals via wireless radios 801a-r and the antennas 252a-r. The wireless radios 801a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include RF spur data 802, noise data 804, MCS data 806, spectrum measurement logic 808, and demodulation logic 810. The RF spur data 802 may include RF spur data such as described with respect to RF spur data 328 of FIG. 3. The noise data 804 may include noise data such as described with respect to noise data 330 of FIG. 3. The MCS data 806 may include MCS data such as described with respect to MCS data 332 of FIG. 3. Spectrum measurement logic 808 may include functionality for spectrum measurement, such as described with respect spectrum measurement module 342 of FIG. 3. Spectrum measurement logic 808 may, alternatively or additionally, be configured to perform one or more operations described with respect to process 500 of FIG. 5. Demodulation logic 810 may include functionality for demodulation of signals in accordance with MCS data 806, such as described with respect to the demodulation module 344 of FIG. 3. The UE 800 may receive signals from or transmit signals to one or more network entities, such as the base station 105 of FIGS. 1-3 or a base station as illustrated in FIG. 9.

In some implementations, the UE 800 may be configured to perform the process 600 of FIG. 6 and/or one or more operations of the process 500 of FIG. 5. To illustrate, the UE 800 may execute, under control of the controller 280, the spectrum measurement logic 808 and/or the demodulation logic 810 stored in the memory 282. The execution environment of the spectrum measurement logic 808 provides the functionality to perform at least the operations in block 506. The execution environment of the demodulation logic 810 provides the functionality to perform at least the operations in blocks 516, 602, and/or 604.

Figure 9:
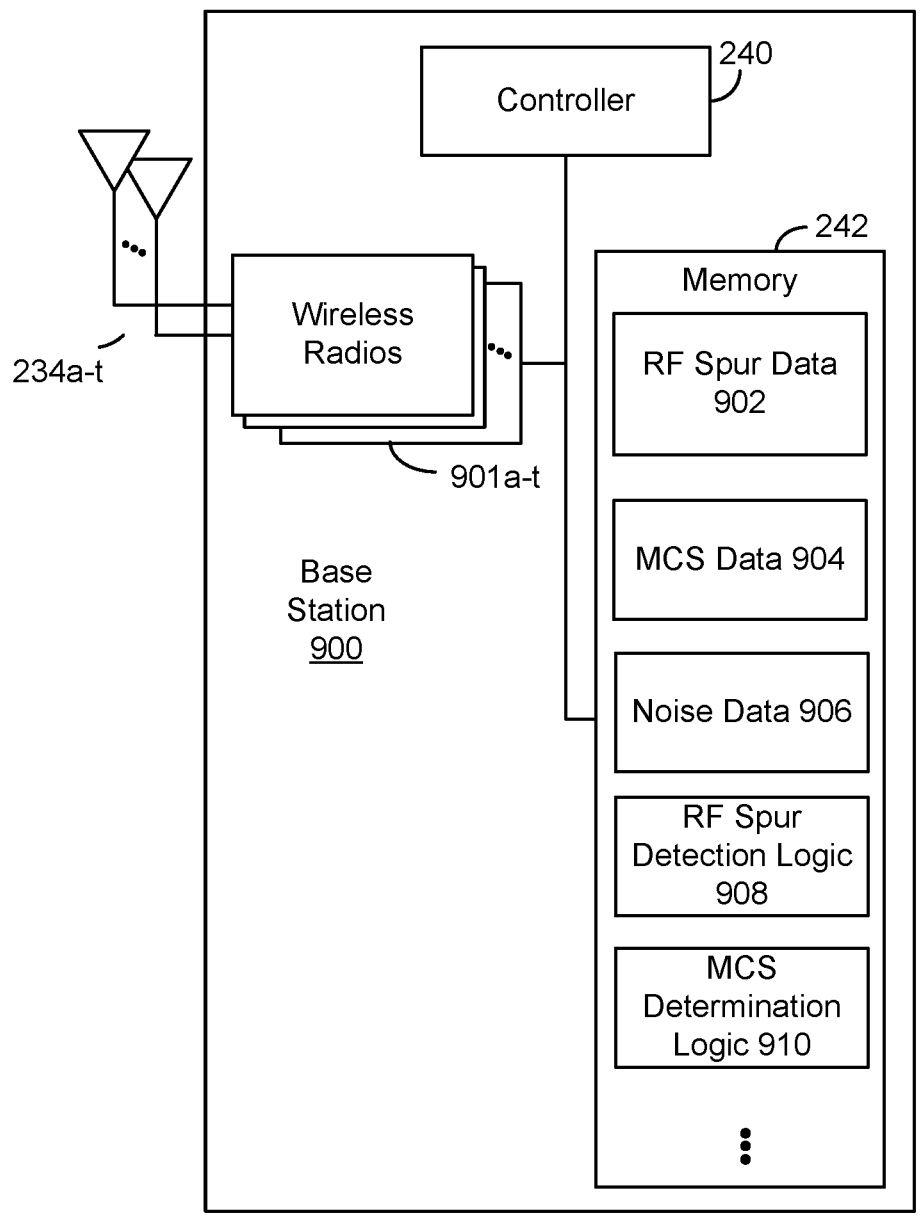
FIG. 9 is a block diagram of an example base station that supports selection of modulation orders that may be associated with resiliency against spur impairment according to one or more aspects.

FIG. 9 is a block diagram of an example base station 900 that supports selection of modulation orders that may be associated with resiliency against spur impairment according to one or more aspects. The base station 900 may be configured to perform operations, including the blocks of the process 700 described with reference to FIG. 7 and/or operations of the process 500 described with reference to FIG. 5. In some implementations, the base station 900 includes the structure, hardware, and components shown and described with reference to the base station 105 of FIGS. 1-3. For example, the base station 900 may include the controller 240, which operates to execute logic or computer instructions stored in the memory 242, as well as controlling the components of the base station 900 that provide the features and functionality of the base station 900. The base station 900, under control of the controller 240, transmits and receives signals via wireless radios 901a-t and the antennas 234a-t. The wireless radios 901a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include RF spur data 902, MCS data 904, noise data 906, RF spur detection logic 908, and MCS determination logic 910. The RF spur data 902 may include RF spur data such as described with respect to RF spur data 306 described with respect to FIG. 3. The noise data 906 may include noise data such as described with respect to noise data 308 of FIG. 3. The MCS data 904 may include MCS data such as described with respect to MCS data 310 of FIG. 3. RF spur detection logic 908 may include functionality for RF spur detection, such as described with respect RF spur detection module 320 of FIG. 3. MCS determination logic 910 may include functionality for determination of MCSs associated with particular sets of subcarriers, such as described with respect to the MCS determination module 322 of FIG. 3.

In some implementations, the base station 900 may be configured to perform the process 700 of FIG. 7 and/or one or more operations of the process 500 of FIG. 5. To illustrate, the base station 900 may execute, under control of the controller 240, the RF spur detection logic 908 and the MCS determination logic 910 stored in the memory 242. The execution environment of the RF spur detection logic 908 provides the functionality to perform at least the operations in block 502. The execution environment of the MCS determination logic 910 provides the functionality to perform at least the operations in block 510 and/or blocks 702-704.

It is noted that one or more blocks (or operations) described with reference to FIGS. 5-7 may be combined with one or more blocks (or operations) described with reference to another of the figures. For example, one or more blocks (or operations) of FIG. 6 may be combined with one or more blocks (or operations) of FIG. 7. As another example, one or more blocks associated with FIGS. 5-7 may be combined with one or more blocks (or operations) associated with FIG. 1, 2, or 3. Additionally, or alternatively, one or more operations described above with reference to FIG. 1, 2, or 3 may be combined with one or more operations described with reference to FIG. 8 or 9.

In some aspects, techniques for enabling selection of modulation orders that may be associated with resiliency against spur impairment may include additional aspects, such as any single aspect or any combination of aspects described below or in connection with one or more other processes or devices described elsewhere herein. In a first aspect, techniques for enabling selection of modulation orders that may be associated with resiliency against spur impairment may include receiving, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and demodulating a first signal received on the first set of one or more subcarriers in accordance with the first modulation order and a second signal concurrently received on the second set of one or more subcarriers in accordance with the second modulation order. In some examples, the techniques in the first aspect may be implemented in a method or process. In some other examples, the techniques of the first aspect may be implemented in a wireless communication device such as a UE or a component of a UE. In some examples, the wireless communication device may include one or more processing units or systems (which may include an application processor, a modem or other components) and one or more memory devices coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, alone or in combination with the first aspect, techniques for enabling selection of modulation orders that may be associated with resiliency against spur impairment may further include receiving, from the network node before receiving the first and second indications, a third indication of a third set of one or more subcarriers with which one or more RF spurs including the first RF spur are associated, wherein the second set of one or more subcarriers comprises at least a portion of the third set of one or more subcarriers.

In a third aspect, alone or in combination with one or more of the first aspect or second aspect, techniques for enabling selection of modulation orders that may be associated with resiliency against spur impairment may further include calculating a difference between a signal level and a noise level for a fourth set of one or more subcarriers that does not overlap the third set of one or more subcarriers in accordance with the received third indication of the third set of one or more subcarriers and transmitting, to the network node before receiving the first and second indications, a fourth indication of the calculated difference.

In a fourth aspect, alone or in combination with one or more of the first aspect through third aspect, the fourth indication of the calculated difference is transmitted in a channel state feedback (CSF) message.

In a fifth aspect, alone or in combination with one or more of the first aspect through fourth aspect, the fourth indication of the calculated difference is an indication of a reference thermal noise power for the fourth set of one or more subcarriers.

In a sixth aspect, alone or in combination with one or more of the first aspect through fifth aspect, the second modulation order is lower than the first modulation order.

In a seventh aspect, alone or in combination with one or more of the first aspect through the sixth aspect, the first modulation order comprises a 16k quadrature amplitude modulation (QAM) modulation order.

In one or more aspects, techniques for enabling selection of modulation orders that may be associated with resiliency against spur impairment may include additional aspects, such as any single aspect or any combination of aspects described below or in connection with one or more other processes or devices described elsewhere herein. In an eighth aspect, supporting selection of modulation orders that may be associated with resiliency against spur impairment may include an apparatus configured to transmit, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node and transmit, to the UE, a first signal on the first set of subcarriers that is modulated in accordance with the first modulation order and concurrently transmitting a second signal on the second set of one or more subcarriers that is modulated in accordance with the second modulation order. Additionally, the apparatus may perform or operate according to one or more aspects as described below. In some implementations, the apparatus includes a wireless device, such as a base station. In some implementations, the apparatus may include one or more processors, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communications may include one or more operations described herein with reference to the apparatus.

In a ninth aspect, alone or in combination with the eighth aspect, the apparatus may be further configured to transmit, to the UE before transmitting the first indication and the second indication, a third indication of a third set of one or more subcarriers with which one or more RF spurs including the first RF spur are associated, wherein the second set of one or more subcarriers comprises at least a portion of the third set of one or more subcarriers.

In a tenth aspect, alone or in combination with one or more of the eighth or the ninth aspect, the apparatus may be further configured to identify, in accordance with a power spectrum density of noise associated with the network node, the third set of one or more subcarriers on which one or more RF spurs are located.

In an eleventh aspect, alone or in combination with one or more of the eighth aspect through the tenth aspect, the apparatus may be further configured to receive, from the UE before transmitting first indication and the second indication, a fourth indication of a difference between a signal level and a noise level for a fourth set of one or more subcarriers that does not overlap the third set of one or more subcarriers.

In a twelfth aspect, alone or in combination with one or more of the eighth aspect through the eleventh aspect, the transmission of the first indication and the second indication is in accordance with the difference between the signal level and the noise level for the fourth set of one or more subcarriers being greater than a power level of the first RF spur associated with each subcarrier of the second set of one or more subcarriers.

In a thirteenth aspect, alone or in combination with one or more of the eighth aspect through the twelfth aspect, the fourth indication of the difference for the fourth set of one or more subcarriers is received in a channel state feedback (CSF) message.

In a fourteenth aspect, alone or in combination with one or more of the eighth aspect through the thirteenth aspect, the fourth indication of the difference for the fourth set of one or more subcarriers is an indication of a reference thermal noise power for the fourth set of one or more subcarriers.

In a fifteenth aspect, alone or in combination with one or more of the eighth aspect through the thirteenth aspect, the second modulation order is lower than the first modulation order.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3 and 8-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
receiving, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node; and
demodulating a first signal received on the first set of one or more subcarriers in accordance with the first modulation order and a second signal concurrently received on the second set of one or more subcarriers in accordance with the second modulation order.

2. The method of claim 1, further comprising:
receiving, from the network node before receiving the first and second indications, a third indication of a third set of one or more subcarriers with which one or more RF spurs including the first RF spur are associated, wherein the second set of one or more subcarriers comprises at least a portion of the third set of one or more subcarriers.

3. The method of claim 2, further comprising:
calculating a difference between a signal level and a noise level for a fourth set of one or more subcarriers that does not overlap the third set of one or more subcarriers in accordance with the received third indication of the third set of one or more subcarriers; and
transmitting, to the network node before receiving the first and second indications, a fourth indication of the calculated difference.

4. The method of claim 3, wherein the fourth indication of the calculated difference is transmitted in a channel state feedback (CSF) message.

5. The method of claim 3, wherein the fourth indication of the calculated difference is an indication of a reference thermal noise power for the fourth set of one or more subcarriers.

6. The method of claim 1, wherein the second modulation order is lower than the first modulation order.

7. The method of claim 6, wherein the first modulation order comprises a 16k quadrature amplitude modulation (QAM) modulation order.

8. A user equipment (UE) comprising:
one or more memories; and
one or more processors coupled with the one or more memories and individually or collectively operable to:
receive, from a network node, a first indication of a first set of one or more subcarriers of a bandwidth and a first modulation order associated with the first set of one or more subcarriers and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node; and
demodulate a signal received on the first set of one or more subcarriers in accordance with the first modulation order and a signal concurrently received on the second set of one or more subcarriers in accordance with the second modulation order.

9. The UE of claim 8, wherein the one or more processors are further operable to:
receive, from the network node before receiving the first indication and the second indication, a third indication of a third set of one or more subcarriers with which one or more RF spurs including the first RF spur are associated, wherein the second set of one or more subcarriers comprises at least a portion of the third set of one or more subcarriers.

10. The UE of claim 9, wherein the one or more processors are further operable to:
calculate a difference between a signal level and a noise level for a fourth set of one or more subcarriers that does not overlap the third set of one or more subcarriers in accordance with the received third indication of the third set of one or more subcarriers; and
transmit, to the network node before receiving the first indication and the second indication, a fourth indication of the calculated difference.

11. The UE of claim 10, wherein the fourth indication of the calculated difference is transmitted in a channel state feedback (CSF) message.

12. The UE of claim 10, wherein the fourth indication of the calculated difference is an indication of a reference thermal noise power for the fourth set of one or more subcarriers.

13. The UE of claim 10, wherein the second modulation order is lower than the first modulation order.

14. The UE of claim 13, wherein the first modulation order comprises a 16k quadrature amplitude modulation (QAM) modulation order.

15. A method for wireless communication performed by a network node, the method comprising:
transmitting, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node; and
transmitting, to the UE, a first signal on the first set of subcarriers that is modulated in accordance with the first modulation order and concurrently transmitting a second signal on the second set of one or more subcarriers that is modulated in accordance with the second modulation order.

16. The method of claim 15, further comprising:
transmitting, to the UE before transmitting the first indication and the second indication, a third indication of a third set of one or more subcarriers with which one or more RF spurs including the first RF spur are associated, wherein the second set of one or more subcarriers comprises at least a portion of the third set of one or more subcarriers.

17. The method of claim 16, further comprising:
identifying, in accordance with a power spectrum density of noise associated with the network node, the third set of one or more subcarriers on which one or more RF spurs are located.

18. The method of claim 16, further comprising:
receiving, from the UE before transmitting first indication and the second indication, a fourth indication of a difference between a signal level and a noise level for a fourth set of one or more subcarriers that does not overlap the third set of one or more subcarriers.

19. The method of claim 18, wherein the transmission of the first indication and the second indication is in accordance with the difference between the signal level and the noise level for the fourth set of one or more subcarriers being greater than a power level of the first RF spur associated with each subcarrier of the second set of one or more subcarriers.

20. The method of claim 18, wherein the fourth indication of the difference for the fourth set of one or more subcarriers is received in a channel state feedback (CSF) message.

21. The method of claim 18, wherein the fourth indication of the difference for the fourth set of one or more subcarriers is an indication of a reference thermal noise power for the fourth set of one or more subcarriers.

22. The method of claim 15, wherein the second modulation order is lower than the first modulation order.

23. A network node comprising:
one or more memories; and
one or more processors coupled with the one or more memories and individually or collectively operable to:
transmit, to a user equipment (UE), a first indication of a first set of one or more subcarriers of a bandwidth and a first modulation order associated with the first set of one or more subcarriers, and a second indication of a second set of one or more subcarriers of the bandwidth and a second modulation order associated with the second set of one or more subcarriers, each subcarrier of the second set of one or more subcarriers being associated with a first radio frequency (RF) spur of a signal spectrum associated with the network node; and
transmit, to the UE, a first signal on the first set of subcarriers that is modulated in accordance with the first modulation order and concurrently transmit a second signal on the second set of one or more subcarriers that is modulated in accordance with the second modulation order.

24. The network node of claim 23, wherein the one or more processors are further operable to:
transmit, to the UE before transmitting first indication and the second indication, a third indication of a third set of one or more subcarriers with which one or more RF spurs including the first RF spur are associated, wherein the second set of one or more subcarriers comprises at least a portion of the third set of one or more subcarriers.

25. The network node of claim 24, wherein the one or more processors are further operable to:
identify, in accordance with a power spectrum density of noise associated with the network node, the third set of one or more subcarriers on which one or more RF spurs are located.

26. The network node of claim 24, wherein the one or more processors are further operable to:
receive, from the UE before transmitting first indication and the second indication, a fourth indication of a difference between a signal level and a noise level for a fourth set of one or more subcarriers that does not overlap the third set of one or more subcarriers.

27. The network node of claim 26, wherein the transmission of the first indication and the second indication is in accordance with the difference for the fourth set of one or more subcarriers being greater than a power level of an RF spur associated with each subcarrier of the second set of one or more subcarriers.

28. The network node of claim 26, wherein the fourth indication of the difference for the fourth set of one or more subcarriers is received in a channel state feedback (CSF) message.

29. The network node of claim 26, wherein the fourth indication of the difference for the fourth set of one or more subcarriers is an indication of a reference thermal noise power for the fourth set of one or more subcarriers.

30. The network node of claim 23, wherein the second modulation order is lower than the first modulation order.

\* \* \* \* \*